(12) United States Patent
Ahn et al.

(10) Patent No.: US 11,501,564 B2
(45) Date of Patent: Nov. 15, 2022

(54) MEDIATING APPARATUS AND METHOD, AND COMPUTER-READABLE RECORDING MEDIUM THEREOF

(71) Applicant: Hyperconnect Inc., Seoul (KR)

(72) Inventors: Sangil Ahn, Cheongju-si (KR); Byungjong Kim, Hanam-si (KR)

(73) Assignee: Hyperconnect Inc., Seoul (KR)

( * ) Notice: Subject to any disclaimer, the term of this patent is extended or adjusted under 35 U.S.C. 154(b) by 28 days.

(21) Appl. No.: 17/123,234

(22) Filed: Dec. 16, 2020

(65) Prior Publication Data

US 2021/0182536 A1 Jun. 17, 2021

(30) Foreign Application Priority Data

Dec. 16, 2019 (KR) ........................ 10-2019-0167482

(51) Int. Cl.
*G06V 40/16* (2022.01)
*G06F 16/538* (2019.01)
*G06F 16/535* (2019.01)

(52) U.S. Cl.
CPC .......... *G06V 40/171* (2022.01); *G06F 16/535* (2019.01); *G06F 16/538* (2019.01); *G06V 40/165* (2022.01); *G06V 40/167* (2022.01)

(58) Field of Classification Search
CPC .. G06V 40/171; G06V 40/165; G06V 40/167; G06V 40/168; G06V 40/172; G06V 30/142; G06V 10/462; G06V 10/507; G06V 20/80; G06V 10/17; G06V 10/24; G06V 40/16; G06V 40/23; G06V 40/28; G06V 20/52; G06V 40/19; G06V 40/197; G06F 16/535; G06F 16/538; G06F 16/532; G06F 16/5854; G06F 16/9535; G06F 3/0482;

(Continued)

(56) References Cited

U.S. PATENT DOCUMENTS 8,812,519 B1 * 8/2014 Bent ................... G06Q 30/0269
707/723
8,867,849 B1 * 10/2014 Kirkham ............. G06F 16/5866
382/305

(Continued)

FOREIGN PATENT DOCUMENTS

CN 101827317 A 9/2010
CN 104737097 A 6/2015

(Continued)

OTHER PUBLICATIONS

Extended European Search Report for European Application No. 20214672.6, Search completed Mar. 12, 2021, dated Mar. 24, 2021, 10 Pgs.

(Continued)

*Primary Examiner* — Nimesh Patel
(74) *Attorney, Agent, or Firm* — KPPB LLP

(57) ABSTRACT

Provided are a mediating apparatus and a mediating method, and a computer-readable recording medium thereof. The mediating method includes: receiving a plurality of images from a first user; generating at least one new image by referring to the plurality of received images; extracting a feature of a face included in the at least one generated new image; searching for a second user corresponding to the feature that has been extracted; and providing the first user with information about the second user.

11 Claims, 9 Drawing Sheets

(58) Field of Classification Search
CPC .............. G06F 16/3331; G06F 16/285; G06F 16/2428; G06F 16/40; G06F 16/50; G06F 16/29; G06F 16/58; G06F 16/435; G06F 16/635; G06F 16/284; G06F 16/248; G06F 21/32; G06F 16/2465; G06F 16/3322; G06F 16/3329; G06F 16/3344; G06F 16/55; G06F 16/95; G06F 17/40; G06Q 50/01; G06Q 30/08; G06Q 30/02; G06Q 20/384; G06Q 30/0269; G06Q 30/0255; G06Q 10/1095; G06Q 30/0224; G06Q 30/0256; G06Q 30/0267; G06Q 20/32; G06Q 30/0258; G06T 7/11; G06T 7/40; H04L 51/32; H04L 67/22; H04L 67/306; H04L 51/14; H04L 51/046; H04L 63/0227; H04L 67/1044; H04L 63/0861; H04L 67/303; H04L 67/20; H04L 63/123; G06K 9/6253; G06K 9/00; G06K 19/0707; G06K 9/6201; G06K 9/6215; G06K 9/6267; H04M 1/0264; H04M 2203/655; H04M 1/72454; H04M 1/6091; H04M 2250/52; H04M 1/72484; H04M 1/72448

See application file for complete search history.

(56) References Cited

U.S. PATENT DOCUMENTS

| | | | |
|---|---|---|---|
| 9,531,998 | B1 | 12/2016 | Farrell et al. |
| 9,733,811 | B2 | 8/2017 | Rad et al. |
| 10,384,136 | B2 | 8/2019 | Chae et al. |
| 10,599,734 | B2 | 3/2020 | Ahn et al. |
| 10,706,118 | B1 | 7/2020 | Yang et al. |
| 10,810,276 | B2 | 10/2020 | Ahn et al. |
| 10,984,488 | B1 | 4/2021 | Colucci |
| 11,296,898 | B2 | 4/2022 | Ahn et al. |
| 11,301,534 | B2 | 4/2022 | Ahn et al. |
| 2004/0076280 | A1 | 4/2004 | Ando et al. |
| 2004/0107144 | A1 | 6/2004 | Short |
| 2005/0047576 | A1 | 3/2005 | Hidesawa et al. |
| 2008/0080745 | A1 | 4/2008 | Vanhoucke et al. |
| 2009/0271244 | A1 | 10/2009 | Kalasapur et al. |
| 2011/0289433 | A1 | 11/2011 | Whalin et al. |
| 2012/0004954 | A1 | 1/2012 | Eisinger et al. |
| 2014/0040368 | A1 | 2/2014 | Janssens |
| 2014/0074824 | A1 | 3/2014 | Rad et al. |
| 2014/0172893 | A1 | 6/2014 | Carter |
| 2014/0280600 | A1 | 9/2014 | Jeon |
| 2015/0067070 | A1 | 3/2015 | Jacques et al. |
| 2015/0341297 | A1 | 11/2015 | Barfield, Jr. et al. |
| 2015/0352451 | A1 | 12/2015 | Brenden et al. |
| 2016/0043987 | A1 | 2/2016 | Ahn et al. |
| 2016/0055571 | A1 | 2/2016 | Wouhaybi et al. |
| 2016/0127500 | A1 | 5/2016 | Rad |
| 2016/0307259 | A1 | 10/2016 | Lubeck et al. |
| 2017/0127123 | A1 | 5/2017 | Lidow et al. |
| 2017/0142482 | A1 | 5/2017 | Zhou |
| 2017/0351770 | A1 | 12/2017 | Ahn et al. |
| 2018/0046946 | A1 | 2/2018 | Mason, Jr. et al. |
| 2018/0048597 | A1 | 2/2018 | Li et al. |
| 2018/0349703 | A1 | 12/2018 | Rathod |
| 2019/0281093 | A1 | 9/2019 | Ahn et al. |
| 2019/0370556 | A1* | 12/2019 | Kline .................... G06V 20/46 |
| 2020/0110788 | A1 | 4/2020 | Ahn et al. |
| 2020/0145609 | A1 | 5/2020 | Ahn et al. |
| 2020/0226193 | A1 | 7/2020 | Ahn et al. |
| 2021/0011966 | A1 | 1/2021 | Ahn et al. |
| 2021/0065314 | A1 | 3/2021 | Storment et al. |
| 2021/0067362 | A1 | 3/2021 | Ahn et al. |
| 2021/0075883 | A1 | 3/2021 | Ahn et al. |
| 2021/0266498 | A1 | 8/2021 | Ahn et al. |
| 2022/0092140 | A1 | 3/2022 | Ahn et al. |

FOREIGN PATENT DOCUMENTS

| | | |
|---|---|---|
| CN | 105247845 A | 1/2016 |
| CN | 105308638 A | 2/2016 |
| EP | 2849411 A1 | 3/2015 |
| JP | 2002109025 A | 4/2002 |
| JP | 2005018358 A | 1/2005 |
| JP | 2005092897 A | 4/2005 |
| JP | 2006197002 A | 7/2006 |
| JP | 2008022109 A | 1/2008 |
| JP | 2008245113 A | 10/2008 |
| JP | 2011077909 A | 4/2011 |
| JP | 2011081575 A | 4/2011 |
| JP | 2013020485 A | 1/2013 |
| JP | 2015517153 A | 6/2015 |
| JP | 2015519852 A | 7/2015 |
| JP | 2016076078 A | 5/2016 |
| JP | 2017045342 A | 3/2017 |
| JP | 2018120461 A | 8/2018 |
| JP | 2019088004 A | 6/2019 |
| JP | 2019149057 A | 9/2019 |
| KR | 20000054824 A | 9/2000 |
| KR | 20030094156 A | 12/2003 |
| KR | 1020050111838 A | 11/2005 |
| KR | 20060056680 A | 5/2006 |
| KR | 20090014473 A | 2/2009 |
| KR | 20090065147 A | 6/2009 |
| KR | 20100023465 A | 3/2010 |
| KR | 20110035651 A | 4/2011 |
| KR | 20130012155 A | 2/2013 |
| KR | 20130057936 A | 6/2013 |
| KR | 20140087175 A | 7/2014 |
| KR | 20150010988 A | 1/2015 |
| KR | 20150029772 A | 3/2015 |
| KR | 20150055634 A | 5/2015 |
| KR | 1020150056504 A | 5/2015 |
| KR | 101700115 B1 | 1/2017 |
| KR | 20190077654 A | 7/2019 |
| KR | 20190080377 A | 7/2019 |
| WO | 0167760 A1 | 9/2001 |
| WO | 2013081345 A1 | 6/2013 |
| WO | 2015036817 A1 | 3/2015 |
| WO | 2017080169 A1 | 5/2017 |

OTHER PUBLICATIONS

Bao et al., "CVAE-GAN: Fine-Grained Image Generation through Asymmetric Training", Arxiv.org, Cornell University Library, 201 Olin Library Cornell University Ithaca, NY 14853, Mar. 29, 2017, pp. 1-15.

Iyengar et al., "Koinophilia and human facial attractiveness", Resonance—Journal of Science Education, Indian Academy of Sciences, India, vol. 20, No. 4, May 3, 2015, pp. 311-319.

Extended European Search Report for Application No. 20192980.9, dated Sep. 28, 2020, 8 Pgs.

Extended European Search Report for European Application No. 20195016.9, Search completed Nov. 20, 2020, dated Dec. 3, 2020, 9 Pgs.

First Office Action of corresponding Korean Patent Application 10-2016-0069563, dated Dec. 8, 2016, 9 Pgs.

International Search Report and Written Opinion for International Application No. PCT/KR2018/001315, Search completed May 16, 2018, dated May 17, 2018, 11 Pgs.

Japanese Office Action for Application No. 2020-137009, dated Aug. 12, 2021.

Japanese Office Action for Application No. 2020-208565 dated Dec. 22, 2021, 3 pages.

Korean Office Action for Application No. 10-2019-0104869, dated Jul. 21, 2020, 10 Pgs.

Korean Office Action for Application No. 10-2019-0111491, dated Aug. 24, 2020, 11 Pgs.

Korean Office Action for Application No. 2020-085492051, dated Dec. 7, 2020, 6 pgs.

(56) References Cited

OTHER PUBLICATIONS

Office Action of corresponding Chinese Patent Application No. 2017-10407120.7, dated Aug. 5, 2019, 16 Pgs.

* cited by examiner

MEDIATING APPARATUS AND METHOD, AND COMPUTER-READABLE RECORDING MEDIUM THEREOF

CROSS-REFERENCE TO RELATED APPLICATION

This application is based on and claims priority under 35 U.S.C. § 119 to Korean Patent Application No. 10-2019-0167482, filed on Dec. 16, 2019, in the Korean Intellectual Property Office, the disclosure of which is incorporated by reference herein in its entirety.

BACKGROUND

1. Field

The disclosure relates to a mediating apparatus and method, and a computer-readable recording medium thereof, and more particularly, to a mediating apparatus and method for searching for the most suitable matching partner by reflecting user's preference, and a computer-readable recoding medium thereof.

2. Description of the Related Art

With the development of communication technologies and downsizing of electronic devices, terminals that are conveniently carried have been widely supplied to general consumers. In particular, portable terminals, such as smartphones or smart tablets, have been widely supplied in recent years. Most of the terminals have communication functions, which enable users to search on the Internet or exchange data with other users by using the terminals.

Users connected via a communication network may or may not know each other. A mediating apparatus may connect a plurality of terminals, including a user's terminal and another user' terminal, to each other. The mediating apparatus may mediate between the terminals so that the user and the other user may exchange data with each other. The mediating apparatus may match the user's terminal and the other user's terminal with one another, among the terminals. Accordingly, users who do not know each other may exchange data with each other via the mediation of the mediating apparatus.

In addition, when matching is established with a person the user does not know via the mediating apparatus, the user may wish to be connected to a counterpart having traits the user prefers. In this regard, the mediating apparatus may consider methods to improve matching satisfaction by reflecting preference of each user.

SUMMARY

The disclosure provides a mediating apparatus and method capable of improving service satisfaction by reflecting preferences of users, and a computer-readable recording medium thereof.

Additional aspects will be set forth in part in the description which follows and, in part, will be apparent from the description, or may be learned by practice of the presented embodiments of the disclosure.

According to an embodiment of the disclosure, a mediating method includes: receiving a plurality of images from a first user; generating at least one new image by referring to the plurality of received images; extracting a feature of a face included in the at least one generated new image; searching for a second user corresponding to the feature that has been extracted; and providing the first user with information about the second user.

The mediating method may further include providing the first user with images of a plurality of users, wherein the receiving of the plurality of images may include receiving an image selected by the first user from among the images of the plurality of users with which the first user has been provided.

The image selected by the first user may correspond to a user preferred by the first user.

The mediating method may further include: receiving a request for mediating a video call with the second user, from the first user who has been provided with the information about the second user; and in response to the request for mediating the video call, establishing a video call session between a first terminal used by the first user and a second terminal used by the second user.

The generating of the new image may further include: obtaining feature point information and texture information of a face included in each of the plurality of images; and generating a new image by referring to the feature point information and the texture information.

The feature point information may correspond to coordinate information about a specific point of each face.

A computer-readable recording medium may be provided, having recorded thereon a program for performing the mediating method according to the disclosure.

According to an embodiment of the disclosure, a mediating apparatus includes: an input/output interface configured to receive a plurality of images from a first user; an image generation unit configured to generate at least one new image by referring to the plurality of received images; a feature extraction unit configured to extract features of a face included in the at least one generated new image; and a controller configured to search for at least one second user corresponding to the extracted features and provide the first user with information about the searched second user.

The input/output interface may be further configured to provide the first user with images of a plurality of users and receive an image selected by the first user from among the images of the plurality of images with which the first user has been provided.

The image selected by the first user may correspond to a user preferred by the first user.

The mediating apparatus may further include a communication interface configured to receive a request for mediating a video call with the second user, from the first user who has been provided with the information about the second user, wherein the controller may be configured to, in response to the request for mediating the video call, establish a video call session between a first terminal used by the first user and a second terminal used by the second user.

The image generation unit may be further configured to obtain feature point information and texture information of a face included in each of the plurality of images and generate the at least one new image by referring to the obtained feature point information and texture information.

The feature point information may correspond to coordinate information about a specific point of each face.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
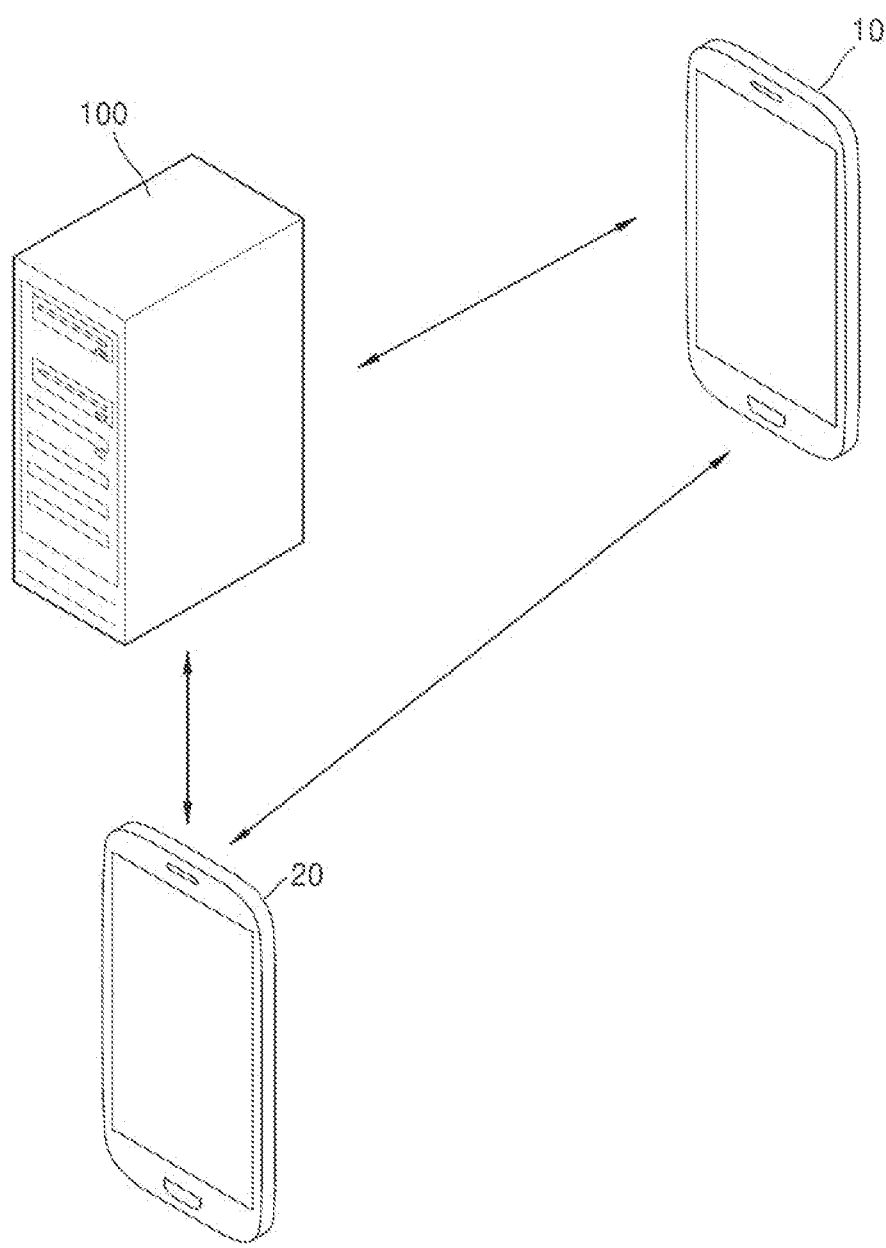
FIG. 1 is a schematic view of an environment in which a mediating apparatus operates, according to the disclosure.

Advantages and features of the disclosure and methods of accomplishing the same may be understood more readily by reference to embodiments described below in detail together with accompanying drawings. In this regard, the embodiments of the disclosure may have different forms and should not be construed as being limited to the descriptions set forth herein. Rather, these embodiments are provided to comprehensively cover the disclosure and to convey the concept of the disclosure to one of ordinary skill in the art, and the disclosure will only be defined by the appended claims. Throughout the specification, like reference numerals denote like elements.

Terms such as "first" and "second" may be used to designate various elements, but the elements should not be limited by these terms. The terms as described above may be used only to distinguish one element from another element. Thus, a first element mentioned hereinbelow may refer to a second element within the technical idea of the disclosure.

It will be understood that terms used herein are used to describe the embodiments and are not intended to limit the scope of the disclosure. As used herein, the singular forms "a", "an", and "the" are intended to include the plural forms as well, unless the context clearly indicates otherwise. As used herein, the terms such as "include (or including)" or "comprise (or comprising)" are intended to indicate the existence of the elements, components, steps, actions, operations, or the like, and are not intended to preclude the possibility that one or more other elements, components, steps, actions, operations, or the like may exist or may be added.

It will be understood that all terms used herein may be interpreted as having a meaning that can be commonly understood by those of ordinary skill in the art unless otherwise defined. The terms as those defined in generally used dictionaries are not construed to be ideally or excessively formal unless clearly defined otherwise.

FIG. 1 is a schematic view of an environment in which a mediating apparatus operates, according to the disclosure.

Referring to FIG. 1, an environment in which a first terminal 10 and a second terminal 20 operate may include a server 100, and the first terminal 10 and the second terminal 20 each being connected to the server 100. For convenience of description, only two terminals, that is, the first terminal 10 and the second terminal 20, are shown in FIG. 1, but more than two terminals may be included. Except for descriptions to be specifically mentioned, descriptions of the first terminal 10 and the second terminal 20 may be applied to terminals which may be added to the disclosure.

The server 100 may be connected to a communication network. The server 100 may be connected to another external device via the communication network. The server 100 may transmit or receive data to or from the other device connected thereto.

The communication network to which the server 100 is connected may include a wired communication network, a wireless communication network, or a complex communication network. The communication network may include mobile communication networks such as 3rd Generation (3G), Long Term Evolution (LTE), or LTE-Advanced (LTE-A). The communication network may also include wired or wireless communication networks such as Wi-Fi, universal mobile telephone system (UMTS)/general packet radio service (GPRS), or ethernet. The communication network may include a local area network such as magnetic secure transmission (MST), radio frequency identification (RFID), near field communication (NFC), ZigBee, Z-Wave, bluetooth, bluetooth low energy (BLE), or infrared communication (IR or InfraRed communication). The communication network may include a local area network (LAN), a metropolitan area network (MAN), or a wide area network (WAN).

The server 100 may receive data from at least one of the first terminal 10 and the second terminal 20. The server 100 may perform a computing operation by using the data received from the at least one of the first terminal 10 and the second terminal 20. The server 100 may transmit a result of the computing operation to at least one of the first terminal 10 and the second terminal 20.

The server 100 may receive a mediation request from at least one of the first terminal 10 and the second terminal 20. The server 100 may select a terminal which has transmitted the mediation request. For example, the server 100 may select the first terminal 10 and the second terminal 20.

The server 100 may mediate a communication connection between the selected first terminal 10 and second terminal 20. For example, the server 100 may mediate a video call connection or a text transmission/reception connection between the first terminal 10 and the second terminal 20. The server 100 may transmit connection information regarding the first terminal 10 to the second terminal 20 or transmit connection information regarding the second terminal 20 to the first terminal 10.

The connection information about the first terminal 10 may include, for example, an IP address and a port number of the first terminal 10. The first terminal 10 which has received the connection information regarding the second terminal 20 may attempt to connect to the second terminal 20 by using the received connection information.

When a connection attempt of the first terminal 10 to the second terminal 20 or a connection attempt of the second terminal 20 to the first terminal 10 is successful, a video call session may be established between the first terminal 10 and the second terminal 20. Through the video call session, the first terminal 10 may transmit an image or sound to the second terminal 20. The first terminal 10 may encode the image or sound into a digital signal and then transmit a result of the encoding to the second terminal 20.

Also, through the video call session, the first terminal 10 may receive an image or sound from the second terminal 20. The first terminal 10 may receive an image or sound, which has been encoded into a digital signal, and then, decode the received image or sound.

Through the video call session, the second terminal 20 may transmit an image or sound to the first terminal 10. Also, through the video call session, the second terminal 20 may receive an image or sound from the first terminal 10. Accordingly, a user of the first terminal 10 and a user of the second terminal 20 may perform a video call with each other.

The first terminal 10 and the second terminal 20 may be, for example, desktop computers, laptop computers, smartphones, smart tablets, smartwatches, mobile terminals, digital cameras, wearable devices, or portable electronic devices. The first terminal 10 and the second terminal 20 may execute a program or application. The first terminal 10 and the second terminal 20 may be the same type or different types of devices.

Figure 2:
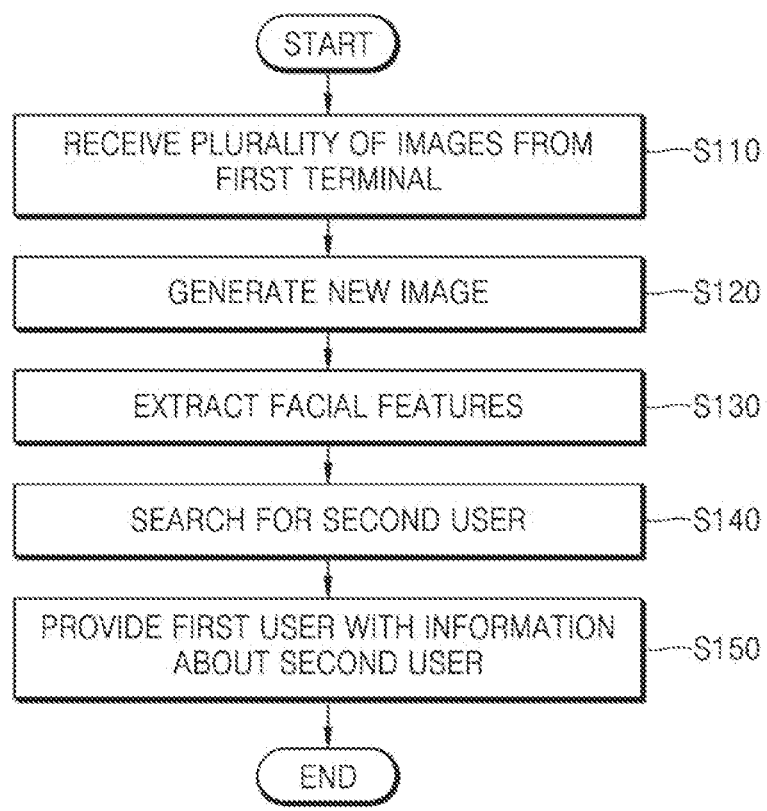
FIG. 2 is a schematic flowchart of a mediating method according to an embodiment of the disclosure.

FIG. 2 is a schematic flowchart of a mediating method according to an embodiment of the disclosure. Referring to FIG. 2, according to an embodiment of the disclosure, the mediating method includes receiving a plurality of images from a first terminal (operation S110), generating a new image (operation S120), extracting features of a face (operation S130), searching for a second user (operation S140), and providing a first user with information about the second user (operation S150).

In operation S110, the images are received from the first user, and in this case, a subject receiving the images may be the server 100 described with reference to FIG. 1. Also, a terminal used by the first user may be defined as the first terminal.

In addition, the images received from the first user may each include a face image of a person. According to the disclosure, the mediating method may include analyzing overall features of an appearance of a counterpart user (e.g., a user of the opposite sex) preferred by an arbitrary user and recommending another user who corresponds to the analyzed features, and the first user may select a plurality of images each including a face image. Also, each of the images may include a profile image of a user.

In operation S120, at least one new image is generated by referring to the received images.

According to an embodiment, the new image generated in operation S120 may be generated by referring to features of each of the images. For example, when generating a new image by referring to the images including a first image and a second image, in a case where a person included in the first image has black hair and a person included in the second image has blond hair, a person to be included in the new image generated in operation S120 may have brown hair. As another example, the size of eyes of the person to be included in the new image may be determined by averaging the size of eyes of the person included in the first image and the size of eyes of the person included in the second image.

For convenience of description, the case where only two images are used to generate a new image has been provided as an example, but as the number of images received in operation S110 increases, a more appropriate image may be newly generated in operation S120.

According to another embodiment, a machine learning model may be used to obtain at least one new image by synthesizing a plurality of images. A plurality of images each including a person's face are used as input data, so that the machine learning model may be trained. For example, the machine learning model used to synthesize the images may be a generative adversarial network (GAN) model including a generator and a discriminator.

In detail, the generator is a network that receives random noise as an input and generates a fake image. The discriminator is a network that receives a real image and the fake image generated by the generator and determines the authenticity of two images. When the GAN model is trained, the discriminator is trained to determine the fake image to be fake, and the generator is trained to determine the fake image to be real. Accordingly, because the training is performed complimentarily by using the two networks, the generator may ultimately generate an image similar to the real image. After the GAN model is trained, a plurality of images are input to the generator, and a new image may be obtained as an output from the generator. However, the machine learning model is not limited to the GAN model.

In operation S130, features of a face included in the generated new image are extracted. The features of the face extracted in operation S130 may include at least one of sizes, shapes, and positions of eyes, nose, mouth, ears, and eyebrows, a skin color, a face size, a hair color and a hairstyle, a position and shape of wrinkles, and an eye color. That is, the features of the face may be understood as providing sufficient information to distinguish one person's face from another person's face.

In an embodiment, the sizes, shapes, and positions of the eyes, nose, mouth, ears, and eyebrows may be obtained by using coordinate information of pixels corresponding to the eyes, nose, mouth, ears, and eyebrows. The face size, and the position and shape of the wrinkles may also be obtained by using coordinate information of pixels corresponding to the face and the wrinkles.

In another embodiment, the features of the face may include information about a distance from a specific point of a face area to the eyes, nose, mouth, ears, and eyebrows. In this case, the specific point of the face area may be defined as a center point of the face image, but the embodiments are not limited thereto. In an embodiment, the distance from the specific point of the face area may be defined as, for example, a distance from the specific point to a center point of an eye area, a distance from the specific point to a center point of a mouth area, etc.

Known methods may be used with respect to extraction of the features of the face. For example, a method of extracting and visualizing feature points of a face, a method of using a trained artificial neural network model, etc. may be used. With respect to extraction of the features of the face, it will be apparent for those of ordinary skill in the art that a method appropriate for implementing the embodiments of the disclosure may be selected from among the known methods and applied.

In operation S140, at least one second user corresponding to the extracted features is searched for. The second user may be a user who uses the same online platform or social network service the first user uses.

In operation S140, when searching for the second user, a profile image uploaded by the second user may be used. For example, an image of the second user provided when the second user signed up for the online platform or social network service may be used. In operation S140, the above profile image may be used to search for a user corresponding to the features extracted in operation S130.

According to an embodiment, in operation S140, in order to search for the second user, the features of the face extracted in operation S130, that is, the coordinate information, the information about the distance, the skin color, the face size, the hair color and the hairstyle, the eye color, or the like, may be used. For example, in operation S140, a user having facial features similar to the features of the face extracted in operation S130 may be searched and designated as the second user. That is, from among a plurality of users who provided their images, a user having facial features similar to the features of the face extracted in operation S130 may be found as the second user, the facial features including the coordinate information, the information about the distance, the skin color, the face size, the hair color and the hairstyle, the eye color, or the like.

According to another embodiment, in operation S140, the machine learning model may be used to search for the second user. A plurality of images each including a person's face are used as input data, so that the machine learning model may be trained. For example, the machine learning model used to search for the second user may include ResNet, Wide ResNet, Efficient Net, or the like, but is not limited thereto. After training the machine learning model, the image generated in operation S120 may be input to the trained machine learning model, and the trained machine learning model may search for at least one second user corresponding to the extracted features, from among a plurality of images stored in a database.

When the machine learning model is used to search for the second user in operation S140, operation S130 may be omitted.

In addition, the second user may be two or more users, and a plurality of users having facial features similar to the features of the face may be found as the second users. For example, when a result of comparing the features of the face extracted in operation S130 and facial features of the users who provided their images is quantified by similarity, higher rank users with a higher similarity may be found as the second users.

In operation S150, information about the second user searched in operation S140 is provided to the first user. The information about the second user may include information about at least one of all or part of a user's ID, a profile image, an age group, a gender, a residential area, an occupation, a hobby, and an interest. In operation S150, the new image generated in operation S120 and the information about the second user may be provided to the first user together.

The profile image of the second user, which is providable in operation S150, may be provided in a blurred or mosaic-processed form. This may encourage the first user to have a desire to identify the second user.

Figure 3A:
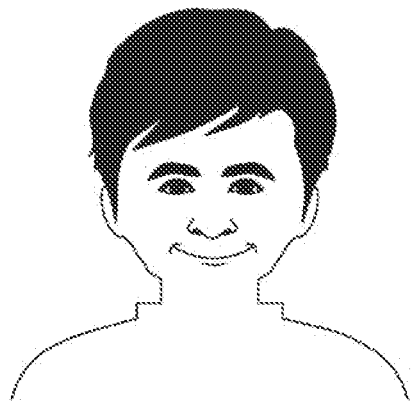
FIGS. 3A and 3B are each a view of an example of one of the images received from the first terminal, according to an embodiment of the disclosure.
Figure 3B:
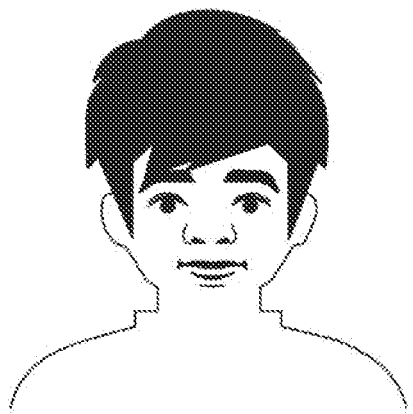
Figure 3C:
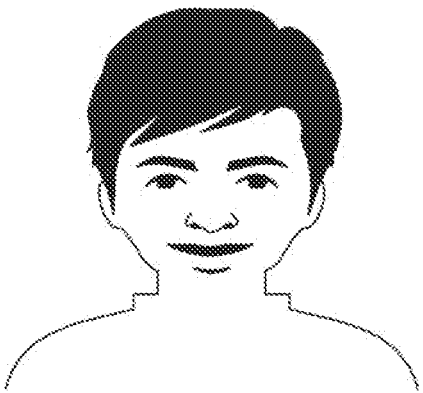
FIG. 3C is a view of an example of the generated new image, according to an embodiment of the disclosure.

FIG. 3 is a view of an example of a process of generating a new image, according to an embodiment of the disclosure. Referring to FIGS. 2 and 3 together, (a) and (b) of FIG. 3 each correspond to one of the images received from the first terminal in operation S110. Also, (c) of FIG. 3 corresponds to the new image generated in operation S120.

For convenience of description, in the images shown in FIG. 3, areas of people other than faces are not shown in detail, but images that are actually received may include other objects, and backgrounds in addition to faces of people. Also, the images received in operation S110 may include faces of different people, respectively.

(a) and (b) of FIG. 3 illustrate faces of different people and thus include different facial features. For example, a person 1 corresponding to (a) of FIG. 3 and a person 2 corresponding to (b) of FIG. 3 have different positions and shapes of eyes, nose, mouth, eyebrows, and ears. Similarly, the person 1 and the person 2 have different shapes of wrinkles at different positions.

(a) of FIG. 3 may be understood as showing a person 3 who is a new person generated by referring to the facial features of the person 1 and the person 2. In an embodiment, the person 3 may be generated to have average feature points of the facial feature points of the person 1 and the person 2. That is, the position, shape, and color of eyebrows of the person 3 may have average features of the positions, shapes, and colors of eyebrows of the person 1 and the person 2.

In addition, the following method may be used to determine the position and shape of eyebrows. First, a face area is detected from an image including a person's face, and respective body parts, such as eyes, nose, mouth, eyebrows, and ears included in the detected face area, may be detected. Thereafter, pixels forming the respective body parts detected above may be determined, and coordinate information of each pixel may be obtained. When the coordinate information is obtained, the shapes of the respective body parts included in the face area may be determined, and the positions thereof may be determined by using the coordinate information.

Also, as for average features of the colors, the color of eyebrows of the person 1 and the color of eyebrows of the person 2 are extracted as RGB values, and an average value of the extracted RGB values may be determined as the color of eyebrows of the person 3. This may be used as a method of determining hair color of the person 3.

In addition, a process of deriving an average of positions, an average of shapes, and an average of colors of the respective body parts may also be applied to determine a distance between eyebrows and a distance between both eyes. For example, a distance between both eyes of the person 1 may be shorter than a distance between both eyes of the person 2, and a distance between both eyes of the person 3 may be determined as an average value of the distances of both eyes of the person 1 and the person 2. That is, when the distance between both eyes of the person 1 is measured as 7 and the distance between both eyes of the person 2 is measured as 10, the distance between both eyes of the person 3 may be determined as 8.5. In addition, the distance between both eyes may be measured as a distance between a coordinate corresponding to a median value of coordinates constituting a right eye and a coordinate corresponding to a median value of coordinates constituting a left eye. However, this is merely an example, and the embodiments are not limited to the above method.

Figure 4A:
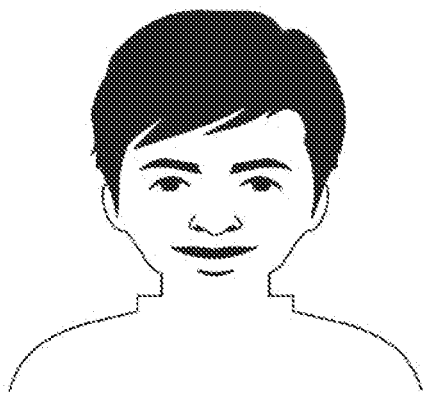
FIG. 4A is a view of an example of the generated new image described by referring to FIG. 3C, according to an embodiment of the disclosure.
Figure 4B:
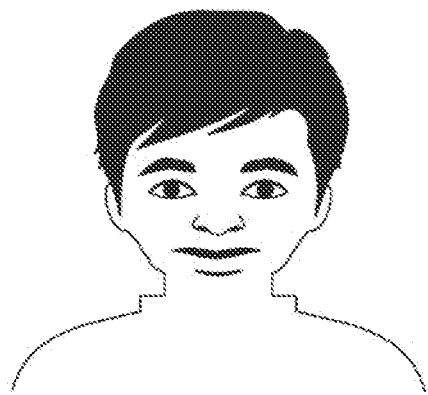
FIG. 4B is a view of an example of a second user who is found, according to an embodiment of the disclosure.

FIG. 4 is an exemplary view of a second user who is searched, according to an embodiment of the disclosure. Referring to FIG. 4, (a) of FIG. 4 illustrates the person 3 described by referring to (c) of FIG. 3, and (b) of FIG. 4 illustrates the second user who is an actual user similar to the person 3.

The person 3 is a virtual person generated by referring to facial features of the person 1 and the person 2, who are included in the images received from the first user, and the second user may be understood as an actual user like the first user.

A plurality of users may have been signed up for the same online platform or social network service the first user and the second user use. The second user in (b) of FIG. 4 may have facial features most similar to those of the virtual person in (a) of FIG. 4 among the users.

The second user in (b) of FIG. 4, who is selected from among the users who use the online platform or social network service may be a user having features extracted from a face of the virtual person in (a) of FIG. 4.

In addition, the facial features of the person 1 in (a) of FIG. 3 and the person 2 in (b) of FIG. 3 may be reflected in the features extracted from the face of the virtual face in (a) of FIG. 4. That is, from among the users who use the online platform or social network service, a user having features derived from the features of the person 1 in (a) of FIG. 3 and the person 2 in (b) of FIG. 3 may be selected as the second user in (b) of FIG. 4.

For example, the second user may be understood as having eyebrows, eyes, nose, mouth, and ears similar to those of the virtual person. Alternatively, the second user may be understood as having features derived from the facial features (e.g., eyebrows, eyes, nose, mouth, and ears) of the person 1 and the person 2. In order to determine similarities for respective major face parts, positions and shapes of major parts of the face of the virtual person may be compared with positions and shapes of major parts of a face of each of the users who use the online platform or social network service.

In an embodiment, similarities for positions and shapes of eyebrows of the virtual person and each of the users may be calculated. Also, similarities for positions and shapes of eyes of the virtual person and each of the users may be calculated. In a similar manner, similarities for positions and shapes of nose, mouth, and ears of the virtual person and each of the users may be respectively calculated.

Also, in an embodiment, an overall similarity for the face may be calculated by collecting the similarities for the eyebrows, eyes, nose, mouth, and ears. The overall similarity for the face may be calculated by applying a predetermined weighted value to each of the similarities for the eyebrows, eyes, nose, mouth, and ears, and the same weighted value may be applied to each of the similarities for the eyebrows, eyes, nose, mouth, and ears.

In addition, the weighted value may be determined by reflecting preference of the first user. For example, when the nose is the most similar feature among people included in the images received from the first user, a weighted value corresponding to the nose may be determined as the largest value. In order to determine a weighted value corresponding to each face part of people, similarity determination may be performed on the people included in the images received from the first user. Referring to FIG. 3, in order to determine how similar the person 1 and the person 2 are to each other, a similarity for each of the eyebrows, eyes, nose, mouth, and ears of the person 1 and the person 2 may be calculated.

In this regard, the largest weighted value may be assigned to a face part with the highest similarity, and the smallest weighted value may be assigned to a face part with the lowest similarity. When the eyes are determined to be the most similar face part between the person 1 and the person 2, the largest weighted value may be assigned to the eyes in a process of searching for the second user. Also, when the mouth is determined to be the least similar face part between the person 1 and the person 2, the smallest weighted value may be assigned to the mouth in the process of searching for the second user.

The users may be aligned based on the similarity to the virtual person. For example, the users may be aligned in order from a user with the highest similarity to a user with the lowest similarity.

As described above with reference to FIG. 2, when the second user is searched, information about the second user may be provided to the first user. The information about the second user may include at least one of a profile picture, an ID, a hobby, a residential area, an age, and an interest of the second user.

Figure 5:
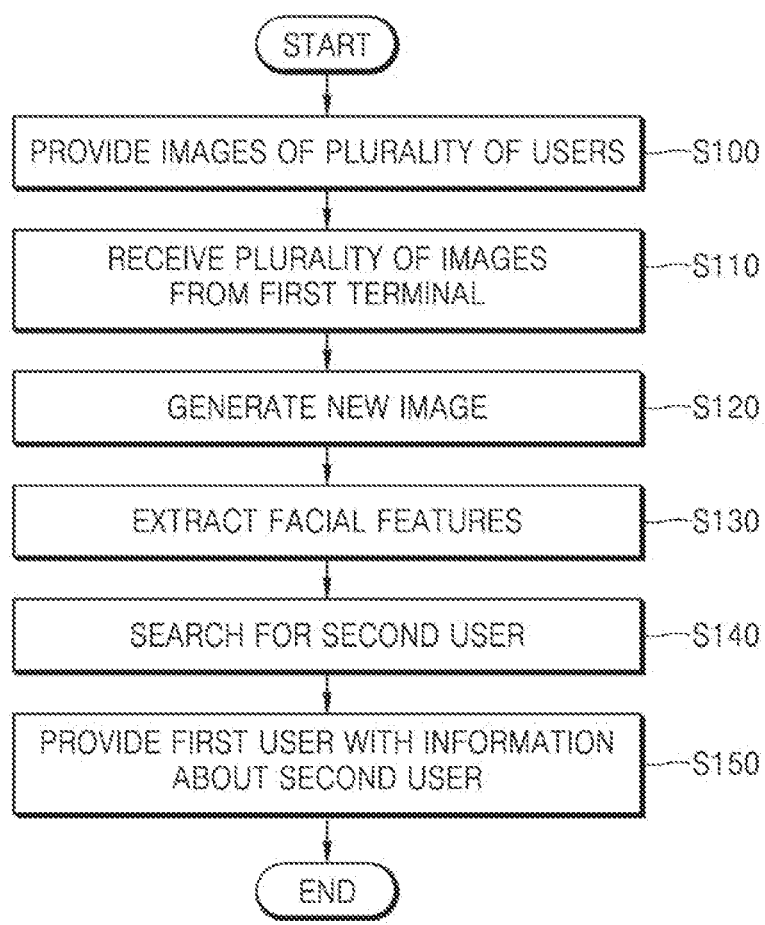
FIG. 5 is a schematic flowchart of a mediating method according to another embodiment of the disclosure.

FIG. 5 is a schematic flowchart of a mediating method according to another embodiment of the disclosure. Referring to FIG. 5, according to another embodiment of the disclosure, the mediating method includes providing images of a plurality of users (operation S100). Operations S110 to S150 are substantially the same as operations S110 to S150 described above with reference to FIG. 2, and thus a detailed description thereof will not be provided herein.

In operation S100, the images of the users are provided to a first user. Then, in operation S110, an image selected by the first user may be received, from among the images of the users provided to the first user. The users may be understood as users who use the same online platform or social network service the first user uses.

The first user may be provided with the images and may select some of the images. The selected some images may include at least two images. The some images selected by the first user may each be an image corresponding to a user preferred by the first user.

The mediating method according to the disclosure may include generating a virtual person by referring to faces included in the images selected by the user, searching for an actual user similar to the generated virtual person, and providing information about the searched actual user.

The first user may select preferred users after receiving images of several users and may be provided with an image of a virtual person generated by referring to facial features of the selected users. Moreover, the first user may be provided with an image of an actual user having facial features similar to those of the virtual person. Therefore, the first user may be provided with an image of an actual user having facial features he or she prefers. According to the disclosure, a new user experience may be provided to users through the configuration described above.

Figure 6:
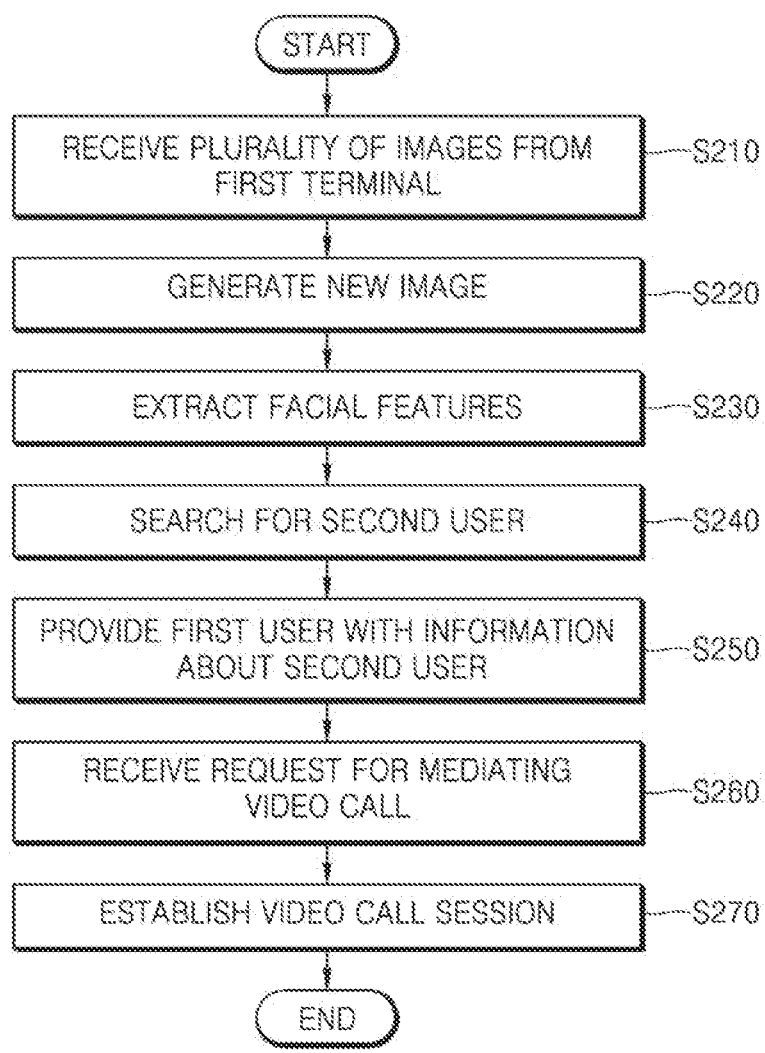
FIG. 6 is a schematic flowchart of a mediating method according to another embodiment of the disclosure.

FIG. 6 is a schematic flowchart of a mediating method according to another embodiment of the disclosure. Referring to FIG. 6, according to another embodiment of the disclosure, the mediating method includes receiving a plurality of images from a first terminal (operation S210), generating a new image (operation S220), extracting a facial features (operation S230), searching for a second user (operation S240), providing the first user with information about the second user (operation S250), receiving a request for mediating a video call (operation S260), and establishing a video call session (operation S270).

In operations S210 to S250, substantially the same operations as in operations S110 to S150 described above with reference to FIG. 2 are performed, and thus a detailed description thereof will not be provided herein.

In operation S260, a request for mediating a video call with the second user is received from the first user who has been provided with the information about the second user. The online platform or social network service described above by referring to the preceding drawings may provide a video call function. For example, the video call function may establish a video call session between a plurality of random users or a plurality of users selected based on a predetermined criterion.

The first user who has been provided with the information about the second user may wish to have a chat or perform a video call with the second user. In operation S260, the request for mediating the video call, corresponding to such a request of the first user, may be received.

The images received from the first terminal may each include a face image of a user preferred by the first user, and the second user is a user who has been searched by referring to facial features of users preferred by the first user. Thus, it may be expected that the probability that the first user will have a good feeling toward the second user is high.

Accordingly, the request for mediating the video call may be received so that a video call may be performed between the first user and the second user, rather than merely providing the first user with the information about the second user.

In operation S270, in response to the request for mediating the video call, a video call session is established between the first terminal used by the first user and the second terminal used by the second user.

When the video call session is established between the first user and the second user, the first user and the second user may transmit and receive data to and from each other. For example, the first user and the second user may transmit and receive data such as video, audio, files, text, etc. to and from each other. Also, the first user and the second user may exchange emoticons, and the first user may transmit a friend request to the second user, or the second user may transmit a friend request to the first user.

Figure 7:
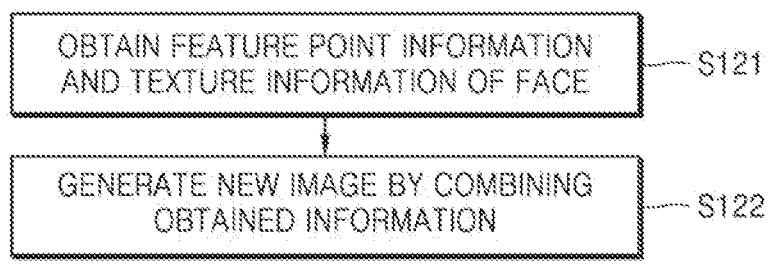
FIG. 7 is a schematic flowchart of a method of generating a new image, according to an embodiment of the disclosure.

FIG. 7 is a schematic flowchart of a method of generating a new image, according to an embodiment of the disclosure. Operations illustrated in FIG. 7 may be understood as being included in the generating of the new image (operation S120) described above with reference to FIG. 2.

Referring to FIG. 7, the generating of the new image (operation S120) may include obtaining feature point information and texture information of a face (operation S121) and generating a new image by combining the obtained information (operation S122). In operation S120, feature point information and texture information of a face included in each of the images received from the first terminal may be obtained.

The feature point information may include position information and shape information of eyebrows, eyes, nose, mouth, and ears of the face included in each of the images. Also, the feature point information may include size information and shape information of the face. In an embodiment, the feature point information may be represented as coordinate information. For example, a size and shape of the face may be determined based on coordinate information of pixels existing in a boundary region which determines a contour of the face. Similarly, positions and shapes of the eyebrows, eyes, nose, mouth, and ears may be determined based on coordinate information of pixels corresponding to the eyebrows, eyes, nose, mouth, and ears.

The texture information may include information on texture of a face and face parts such as eyebrows, eyes, nose, mouth, and ears. The information on texture may include color information and may further include information on wrinkles around each of the face parts.

In operation S122, the new image may be generated by referring to the feature point information and the texture information. As described above with reference to FIG. 3, a face area of a person may be extracted from among the images received from the first terminal, and face parts such as the eyebrows, eyes, nose, mouth, and ears may also be extracted from the extracted face area. Alternatively, a process of extracting the face area and a process of extracting the face parts may be independently performed.

Because the feature point information includes position information and shape information of the face and the face parts, positions and shapes of a face and face parts of a virtual new person may be determined by referring to the feature point information. Also, because the texture information includes texture and color information of the face and the face parts, texture and color of each of the face and the face parts of the virtual new person may be determined by referring to the texture information.

Figure 8:
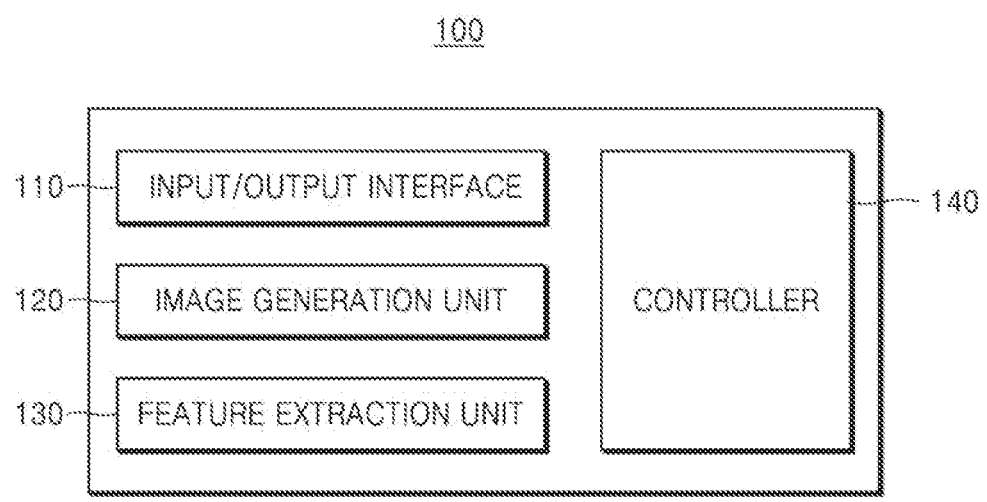
FIG. 8 is a schematic view of a configuration of a mediating apparatus according to an embodiment of the disclosure.

FIG. 8 is a schematic view of a configuration of a mediating apparatus according to an embodiment of the disclosure. Referring to FIG. 8, according to an embodiment of the disclosure, a mediating apparatus 100 includes an input/output interface 110, an image generation unit 120, a feature extraction unit 130, and a controller 140.

The input/output interface 110 may receive a plurality of images from a first user. The images received from the first user may each include a face image of a person. A mediating apparatus according to the disclosure may analyze overall features of an appearance of a counterpart user preferred by an arbitrary user and recommend another user who corresponds to the analyzed features, and the first user may select a plurality of images each including a face image. Also, each of the images may include a profile image of a user. The input/output interface 110 may include any one or any combination of a digital modem, a radio frequency (RF) modem, a WiFi chip, an input/output port and related software and/or firmware.

In another embodiment, the images may be some of the images provided to the first user from the input/output interface 110. For example, the input/output interface 110 may provide the first user or a first terminal used by the first user with a plurality of images respectively corresponding to a plurality of users. Then, the first user may select some of the images provided from the input/output interface 110. In this regard, the images selected by the first user may each correspond to a user having an appearance preferred by the first user.

The image generation unit 120 generates at least one new image by referring to the received images. The new image may be generated by referring to features of each of the images. For example, when generating a new image by referring to the images including a first image and a second image, in a case where a person included in the first image has black hair and a person included in the second image has blonde hair, a person to be included in the new image generated by the image generation unit 120 may have brown hair. As another example, the size of eyes of the person to be included in the new image may be determined by averaging the size of eyes of the person included in the first image and the size of eyes of the person included in the second image.

For convenience of description, a case where only two images are used to generate a new image has been provided as an example, but as the number of images received through the input/output interface 110 increases, a more appropriate image may be newly generated by the image generation unit 120.

The image generation unit 120 may obtain feature point information and texture information of a face included in each of the images and generate the new image by referring to the obtained feature point information and texture information.

The feature point information may include position information and shape information of eyebrows, eyes, nose, mouth, and ears of the face included in each of the images. Also, the feature point information may include size information and shape information of the face. In an embodiment, the feature point information may be represented as coordinate information. For example, a size and shape of the face may be determined based on coordinate information of pixels existing in a boundary region that determines a contour of the face. Similarly, positions and shapes of the eyebrows, eyes, nose, mouth, and ears may be determined based on coordinate information of pixels corresponding to the eyebrows, eyes, nose, mouth, and ears.

The texture information may include information on texture of a face and face parts such as eyebrows, eyes, nose, mouth, and ears. The information on texture may include color information and may further include information on wrinkles around each of the face parts.

The image generation unit 120 may generate the new image by referring to the feature point information and the texture information. As described above with reference to FIG. 3, a face area of a person may be extracted from among the images received from the first terminal, and face parts such as the eyebrows, eyes, nose, mouth, and ears may also be extracted from the extracted face area. Alternatively, a process of extracting the face area and a process of extracting the face parts may be independently performed.

Because the feature point information includes position information and shape information of the face and the face parts, positions and shapes of a face and face parts of a virtual new person may be determined by referring to the feature point information. Also, because the texture information includes texture and color information of the face and the face parts, texture and color of each of the face and the face parts of the virtual new person may be determined by referring to the texture information.

The feature extraction unit 130 extracts features of the face included in the new image generated by the image generation unit 120. The features of the face extracted by the feature extraction unit 130 may include at least one of sizes, shapes, and positions of eyes, nose, mouth, ears, and eyebrows, a skin color, a face size, a hair color and a hairstyle, a position and shape of wrinkles, and an eye color. That is, the features of the face may be understood as providing sufficient information to distinguish one person's face from another person's face.

In an embodiment, the sizes, shapes, and positions of the eyes, nose, mouth, ears, and eyebrows may be obtained by using coordinate information of pixels corresponding to the eyes, nose, mouth, ears, and eyebrows. The face size, and the position and shape of the wrinkles may also be obtained by using coordinate information of pixels corresponding to the face and the wrinkles.

In another embodiment, the features of the face may include information about a distance from a specific point of a face area to the eyes, nose, mouth, ears, and eyebrows. In this case, the specific point of the face area may be defined as a center point of the face image, but the embodiments are not limited thereto. Also, the distance from the specific point of the face area may be defined as, for example, a distance from the specific point to a center point of an eye area, a distance from the specific point to a center point of a mouth area, etc.

Known methods may be used with respect to extraction of the facial feature. For example, a method of extracting and visualizing feature points of a face, a method of using a trained artificial neural network model, etc. may be used. With respect to extraction of the facial feature, it will be apparent for those of ordinary skill in the art that a method appropriate for implementing the embodiments of the disclosure may be selected from among the known methods and applied.

The controller 140 searches for at least one second user corresponding to the extracted features and provides the first user with information about the searched second user. The second user may be a user who uses the same online platform or social network service the first user uses.

When the controller 140 searches for the second user, a profile image uploaded by the second user may be used. For example, an image of the second user provided when the second user signed up for the online platform or social network service may be used. The controller 140 may use the above profile image to search for a user corresponding to the features extracted by the feature extraction unit 130.

In order for the controller 140 to search for the second user, the features of the face extracted by the feature extraction unit 130, that is, the coordinate information, the information about the distance, the skin color, the face size, the hair color and the hairstyle, the eye color, or the like, may be used. For example, the controller 140 may search for a user having facial features similar to the features of the face extracted by the feature extraction unit 130 and designate the user as the second user. That is, from among a plurality of users who provided their images, a user having facial features similar to the features of the face extracted by the feature extraction unit 130 may be searched as the second user, the facial features including the coordinate information, the information about the distance, the skin color, the face size, the hair color and the hairstyle, the eye color, or the like.

In addition, the second user may be two or more users, and a plurality of users having facial features similar to the features of the face may be searched as the second users. For example, when a result of comparing the features of the face extracted by the feature extraction unit 130 and facial features of the users who provided their images is quantified by similarity, higher rank users with a higher similarity may be searched as the second users.

The controller 140 provides, to the first user, information about the searched second user. The information about the second user may include information about at least one of all or part of a user's ID, a profile image, an age group, a gender, a residential area, an occupation, a hobby, and an interest. The controller 140 may provide, to the first user, the new image generated by the image generation unit 120 and the information about the second user together.

In an embodiment, the profile image of the second user, which is providable by the controller 140, may be provided in a blurred or mosaic-processed form. This may encourage the first user to have a desire to identify the second user.

Figure 9:
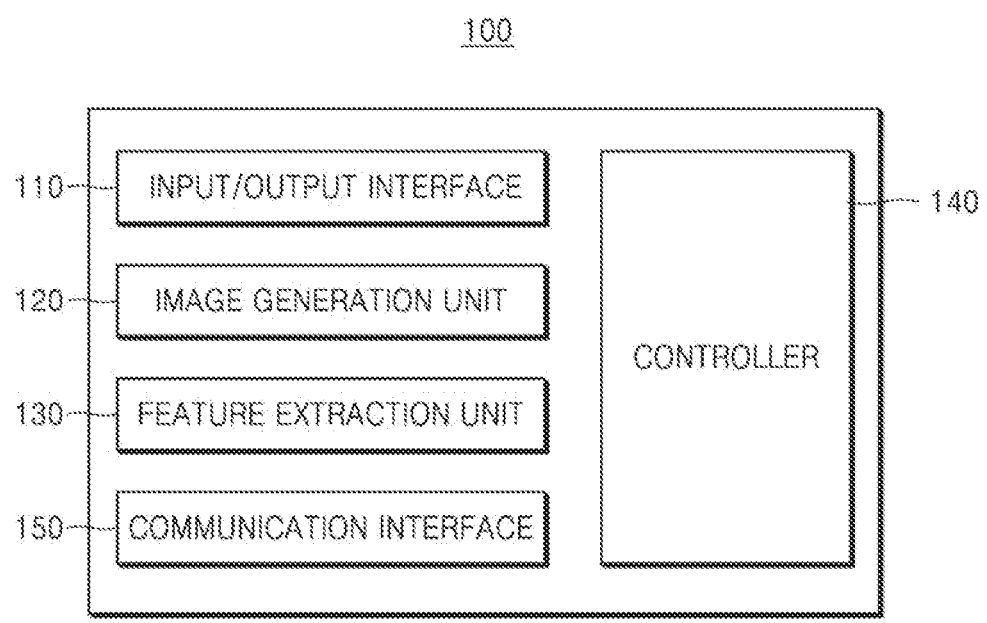
FIG. 9 is a schematic view of a configuration of a mediating apparatus according to another embodiment of the disclosure.

FIG. 9 is a schematic view of a configuration of a mediating apparatus according to another embodiment of the disclosure. Referring to FIG. 9, according to another embodiment of the disclosure, the mediating apparatus further includes a communication interface 150.

The communication interface 150 may receive a request for mediating a video call with the second user from the first user who has been provided with the information about the second user. The online platform or social network service described above may provide a video call function. For example, the video call function may establish a video call session between a plurality of random users or a plurality of users selected based on a predetermined criterion. The communication interface 150 may include any one or any combination of a digital modem, a radio frequency (RF) modem, a WiFi chip, an input/output port and related software and/or firmware.

The first user who has been provided with the information about the second user may wish to have a chat or perform a video call with the second user. The communication interface 150 may receive the request for mediating the video call, corresponding to such a request of the first user.

The images received from the first terminal may each include a face image of a user preferred by the first user, and the second user is a user who has been searched by referring to facial features of users preferred by the first user. Thus, it may be expected that the probability that the first user will have a good feeling toward the second user is high.

Accordingly, the request for mediating the video call may be received so that a video call may be performed between the first user and the second user, rather than merely providing the first user with the information about the second user.

In response to the request for mediating the video call, the controller 140 may establish a video call session between the first terminal used by the first user and the second terminal used by the second user.

When the video call session is established between the first user and the second user, the first user and the second user may transmit and receive data to and from each other. For example, the first user and the second user may transmit and receive data such as video, audio, files, text, etc. to and from each other. Also, the first user and the second user may exchange emoticons, and the first user may transmit a friend request to the second user, or the second user may transmit a friend request to the first user.

The disclosure may provide a mediating apparatus and method capable of improving service satisfaction by reflecting preference of users, and a computer-readable recording medium thereof.

The afore-described embodiments of the disclosure may also be implemented in the form of a recording medium including instructions executable by a computer, e.g., a program module executed by the computer. The computer-readable medium may be an arbitrary available medium accessible by the computer, and examples thereof may include volatile, nonvolatile, detachable, and non-detachable media.

Also, the computer-readable medium may include a computer storage medium. Examples of the computer storage medium may include volatile, nonvolatile, detachable, and non-detachable media implemented in any method or technology for storage of information, e.g., computer-readable instructions, data structures, program modules, or other data.

Although the embodiments of the disclosure have been described above with reference to the accompanying drawings, those of ordinary skill in the art will appreciate that the embodiments of the disclosure can be implemented in other specific forms without changing the technical idea or essential configurations thereof. Therefore, the embodiments should be considered in descriptive sense only and not for purposes of limitation.

At least one of the components, elements, modules or units (collectively "components" in this paragraph) represented by a block in FIGS. 8 and 9 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

What is claimed is:

1. A mediating method for performing matching services, comprising:
providing a first user with images of a plurality of users, wherein users in the plurality of users are different from the first user;
receiving a plurality of images from a first user, wherein the plurality of images is selected by the first user from among the provided images of the plurality of users;
generating at least one new image of a face, wherein the face includes a set of one or more features combined based on corresponding features from each image in a subset of the plurality of received images;
extracting a combined feature from the set of one or more features included in the at least one generated new image;
searching for second user corresponding to the combined feature that has been extracted; and
providing the first user with information about the second user.

2. The mediating method of claim 1, wherein
features of the plurality of received images are reflected in the combined feature extracted with respect to the new image.

3. The mediating method of claim 1, wherein
receiving a request for mediating a video call with the second user, from the first user who has been provided with the information about the second user; and
in response to the request for mediating the video call, establishing a video call session between a first terminal used by the first user and a second terminal used by the second user.

4. The mediating method of claim 1, wherein
the generating of the new image comprises:
obtaining feature point information and texture information of a face included in each of the plurality of images; and
generating a new image by referring to the feature point information and the texture information.

5. The mediating method of claim 4, wherein
the feature point information corresponds to coordinate information about a specific point of each face.

6. A non-transitory computer-readable recording medium having, recorded thereon, a program for performing the method of claim 1.

7. A mediating apparatus for performing matching services, comprising:
an input/output interface configured to provide a first user with images of a plurality of users, wherein users in the plurality of users are different from the first user, and receive a plurality of images from a first user, wherein the plurality of images is selected by the first user from among the provided images of the plurality of users;

an image generation unit configured to generate at least one new image of a face, wherein the face includes a set of one or more features combined based on corresponding features from each image in a subset of the plurality of received images;

a feature extraction unit configured to extract a combined feature from the set of one or more features included in the at least one generated new image; and a controller configured to search for second user corresponding to the combined feature that has been extracted and provide the first user with information about the found second user.

8. The mediating apparatus of claim 7, wherein features of the plurality of received images are reflected in the combined feature extracted with respect to the new image.

9. The mediating apparatus of claim 7, further comprising a communication interface configured to receive a request for mediating a video call with the second user, from the first user who has been provided with the information about the second user, wherein the controller is configured to, in response to the request for mediating the video call, establish a video call session between a first terminal used by the first user and a second terminal used by the second user.

10. The mediating apparatus of claim 7, wherein the image generation unit is further configured to obtain feature point information and texture information of a face included in each of the plurality of images and generate the at least one new image by referring to the obtained feature point information and texture information.

11. The mediating apparatus of claim 7, wherein the feature point information corresponds to coordinate information about a specific point of each face.

* * * * *